United States Patent [19]

Wilson

[11] 4,441,534
[45] Apr. 10, 1984

[54] APPARATUS FOR CUTTING AND/OR GRINDING OF TREE STUMPS

[76] Inventor: James Wilson, 45 Lucan Ave., Aspley, Queensland, 4034, Australia

[21] Appl. No.: 343,822

[22] Filed: Jan. 29, 1982

[51] Int. Cl.³ .............................................. A01G 23/06
[52] U.S. Cl. ..................................... 144/2 N; 30/122; 144/208 C
[58] Field of Search ................. 30/122; 144/2 N, 1 R, 144/35 R, 35 A, 1 E, 1 F, 208 C, 208 J

[56] References Cited

U.S. PATENT DOCUMENTS

| | | | |
|---|---|---|---|
| 2,783,794 | 3/1957 | Kroll | 144/35 A |
| 2,810,409 | 10/1957 | Ibelle et al. | 30/122 |
| 2,821,216 | 1/1958 | West et al. | 144/208 J |
| 2,825,370 | 3/1958 | Fieber | 144/2 N |
| 2,887,134 | 5/1959 | Bartlett | 144/2 N |
| 2,927,613 | 3/1960 | Franzen et al. | 144/2 N |
| 3,004,568 | 10/1961 | Wachtel | 144/2 N |
| 3,625,267 | 12/1971 | Welborn | 144/2 N |
| 3,797,544 | 3/1974 | Ver Ploeg | 144/2 N |

*Primary Examiner*—W. D. Bray
*Attorney, Agent, or Firm*—Murray Schaffer

[57] ABSTRACT

Apparatus for cutting and/or grinding tree stumps including an elongated member having a cutting disc mounted for rotation at one end and a chain bar fixed to one side of the elongated member to support a chain saw drive motor so that the cutting disc may be driven for rotation. The elongated member is pivotally mounted to a support post. The user grips the drive motor with one hand and the support post with the other hand to move the cutting disc towards and away from a tree stump.

9 Claims, 4 Drawing Figures

APPARATUS FOR CUTTING AND/OR GRINDING OF TREE STUMPS

This invention relates to apparatus for cutting and/or grinding of tree stumps.

Stumps of trees which have been felled or stumps which have been left in the ground due to other circumstances are normally extremely difficult to remove. In some instances explosives may be employed but this of course is not practicable in all circumstances. There are presently known tree stump grinders which can be mounted to a tractor and engaged with a stump so that a major portion of the stump can be ground away and so that the stump can be subsequently removed. Such tractor mounted grinders however are large and unwieldly and are thus unsuitable if the stump is located in a confined area.

The present invention aims to overcome the above disadvantages by providing apparatus for cutting and/or grinding of tree stumps which is of a portable nature and which is readily manipulatable and light in weight so that tree stumps in many areas can be cut and ground away and then removed if desired even where it is impossible to swing an axe or a mattock. Other objects and advantages of the invention will become apparent from the following description.

With the above and other objects in view the invention resides broadly in an apparatus for cutting and/or grinding tree stumps including elongated support means, blade means rotatably mounted at one end of said support means and means for mounting drive means adjacent the opposite end of said support means whereby said drive means may be operably coupled to said blade means to cause rotation thereof, and there being provided means for pivotally supporting said support means whereby said blade means may be selectively moved into engagement with a said stump to cause cutting and/or grinding thereof.

In order that the invention may be more readily understood and put into practical effect, reference will now be made to the accompanying drawings which illustrate a preferred embodiment of the invention and wherein.

Figure 1:
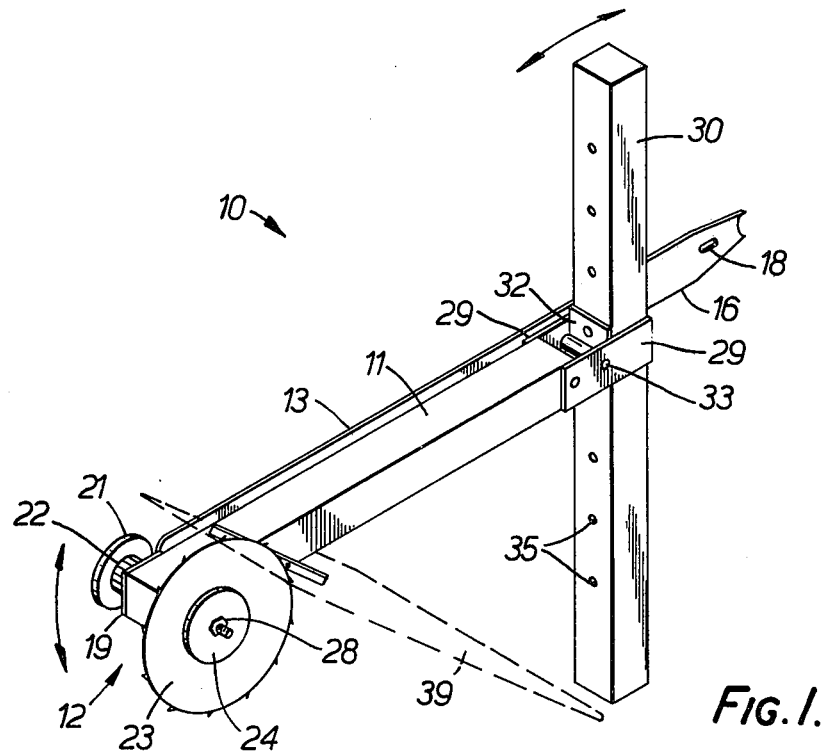
FIG. 1 is a perspective view of the apparatus according to the present invention.
Figure 2:
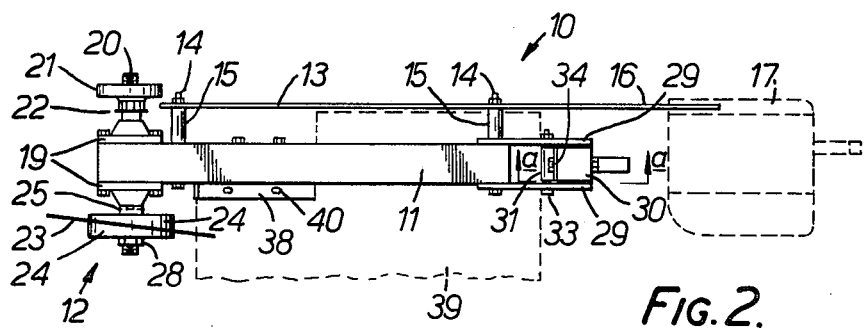
FIG. 2 is a plan view of the apparatus illustrated in FIG. 1.

Referring to the drawings, there is illustrated apparatus 10 for cutting and/or grinding of tree stumps according to the present invention including an elongated support member 11 formed in this embodiment of a hollow box section of steel and having a rotatably mounted blade assembly 12 at its forward end. The apparatus is particularly suitable for use with a chain saw drive motor and for that purpose includes a conventional chain saw bar 13 which is fixed to one side of the elongated support member 11 by means of a pair of bolts 14 extending transversely through the elongated section 11. Tubular spacers 15 are provided about each bolt 14 between the chain saw bar 13 and the elongated member 11 so that the bar 13 extends substantially parallel to the member 11. The bar 13 is adapted to be engaged at one end 16 with a chain saw drive motor 17 shown in dotted outline in FIG. 2. For this purpose, the end 16 is slotted at 18 to receive bolts whereby the motor 17 may be bolted to the bar 13. Alternatively any conventional motor such as a lawn mower internal combustion engine may be mounted to the bar 13. Similarly an electric motor may be employed as the drive means.

A pair of aligned bearing assemblies 19 are arranged at the forward end of the elongated member 11 and affixed on either side thereof by bolts to support a blade mounting shaft 20 for rotation. The blade mounting shaft 20 is threaded at either end and a sprocket wheel 21 is fixed by a nut to one end of the shaft so that the sprocket teeth 22 thereof are aligned with the chain saw bar 13. A blade 23 is mounted to the other end of the shaft and preferably is associated with a pair of off-set complimentary collars 24 which are arranged on either side of the blade 23 to co-operate therewith to maintain the blade 23 at an inclined angle relative to the shaft 20. The cutting blade 23 is preferably a conventional tungsten carbide tipped circular saw blade. Preferably each bolt which extends through the member 11 is provided with a tubular bush which extends between the inner faces of the member 11 so as to improve rigidity thereof and prevent distortion thereof on tightening of the bolts.

Figure 4:
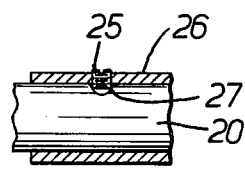
FIG. 4 illustrates a portion of the blade mounting shaft of the apparatus.

Preferably and as more clearly illustrated in FIG. 4 a grub screw 25 is threadably mounted in the inner 26 of the bearing assembly 19 adjacent the cutting blade 23 and is adapted to be screwed into engagement with an aligned dimple 27 formed in the shaft 20. Thus, when the nut 28 on the end of the shaft 20 is tightened to lock the blade 23 in position the engaging grub screw 25 and the dimple 27 prevent axial movement of the shaft 20 and thus preloading of the bearing assemblies 19.

Figure 3:
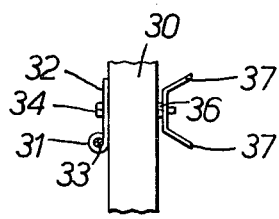
FIG. 3 is a view along line a—a of FIG. 2.

A pair of plate members 29 are fixed to the opposite end of the elongated member 11 to extend outwardly therefrom and an upstanding post 30 is adapted to be pivotally mounted between the plate members 29 by the arrangement illustrated in FIG. 3. As shown, a bush 31 having an extended leg 32 is pivotally mounted between the plate members 29 by means of a bolt 33. An aperture is provided centrally in the leg 32 so as to receive a bolt 34 therethrough which bolt is selectively engageable through one of a number of spaced apertures 35 in the upstanding post 30. The bush leg 32 may then be fixed to the post 30 by means of a nut 36 which engages with the bolt 34. Preferably the nut is provided with extended handle portions 37 so as to allow easy manual engagement and tightening thereof. Thus it can be seen that the post 30 and elongated member 11 may be interconnected for pivotal movement about the bolt 33.

So as to improve safety of the apparatus in operation, an angle member 38 is fixed to one side of the elongated section 11 at an inclined angle thereto and adjacent the cutting blade assembly 12. A flexible guard 39 shown in dotted outline is adapted to be attached to the angle member by a pair of fasteners such as bolts 40 or the like to prevent chips and saw dust flying towards the operator and thus improve the safety of the device.

So that drive may be transmitted to the blade assembly 12, a drive chain (not shown) of conventional form is mounted along the edges of the chain saw bar 13 and around the sprocket 21 and about a sprocket driven by the chain saw drive motor 17. This chain replaces the conventional cutting chain of the chain saw. Alternatively a drive belt may be used and the chain sprockets replaced by pulley members.

In use the apparatus 10 is placed adjacent a stump to be cut or ground with the post 30 in a substantially upstanding attitude. The upper end of the post 30 is then grasped by one hand whilst the chain saw motor 17 is grasped in the other hand and raised or lowered so that the cutting blade 23 may be moved towards or away from the stump to be cut. The post 30 also may be pivoted forwardly or rearwardly to move the cutting blade in a corresponding forward and rearwards direction. The axis of pivotal movement of the elongate member 11 about the post 30 is so arranged that the whole cutting assembly is substantially balanced about the bolt 33. The off-set collars 24 cause the blade 23 to oscillate in a swash-plate like manner when rotated so that a wide cut is achieved in the stump. The cutting procedure is continued by manipulating the apparatus so that the whole stump or the majority thereof can be cut or ground away. Alternatively, the lateral roots of the stump may be cut whereby the stump may be relatively easily removed from the ground.

Thus as can be seen the apparatus of the invention may be used in confined spaces and as such is particularly efficient for removal of stumps in relatively inaccessible areas. More than one blade may be fitted to the apparatus and it is not essential that the blade or blades be mounted in an inclined manner although this is preferable. Furthermore as can be seen, the elongated member may be adjusted to any vertical position along the support post. In some instances the support post may be extended with portions at the upper and lower end thereof and inclined thereto and if necessary the lower end of the post may be provided with foot means.

In an alternative arrangement, the post 30 may be eliminated and replaced by a downwardly extending support structure fixed to the elongated member 11 and having wheels at the lower end whereby the cutting assembly may be pivoted about the wheel axis or rolled towards or away from the stump.

While the above has been given by way of illustrative embodiment of the invention, all such modifications and variations as would be apparent to persons skilled in the art are deemed to fall within the broad scope and ambit of the invention as herein defined by the appended claims.

I claim:

1. Apparatus for removing tree stumps including elongated support means, toothed circular blade means mounted at one end of said support means for rotary movement about an axis extending transversely of said support means, means at the opposite end of said support means for engaging and supporting a chain saw drive motor, said drive motor being adapted to be coupled to said blade means to cause rotation thereof and there being provided ground engageable means intermediate the ends of said elongated support means, said ground engageable means supporting said elongated support means for pivotal movement about an axis extending transversely of said support means and said elongated support means being substantially balanced in use about said axis, said ground engageable means and said chain saw drive motor being adapted to be manually gripped by an operator to permit selective manipulation of said blade means towards and away from a stump to be removed.

2. Apparatus according to claim 1, wherein said elongated support means comprises a first elongated member and a second elongated member spaced therefrom and extending parallel thereto, said blade means being disposed at one end of said first elongated member and said second elongated member extending beyond the opposite end of said first member for engaging and supporting said drive motor.

3. Apparatus according to claim 1, wherein said circular blade means is mounted on shaft means extending transversely of said elongated support means, said blade means being supported at an inclined angle relative to said shaft means whereby said blade means oscillates upon rotation to facilitate removal of said stump.

4. Apparatus according to claim 3 and including a pair of mating offset collars mounted on said shaft means and engaged with opposite sides of said blade means to maintain said blade means at said inclined angle relative to said shaft means.

5. Apparatus according to claim 1, wherein said drive motor is coupled to said blade means via endless belt means.

6. Apparatus for removing tree stumps including elongated support means, toothed circular blade means mounted at one end of said support means for rotary movement about an axis extending transversely of said support means, means at the opposite end of said elongated support means for engaging and supporting a chain saw drive motor, said drive motor being adapted to be coupled to said blade means to cause rotation thereof and there being provided ground engageable post means intermediate the ends of said elongated support means, said elongated support means being pivotally connected to said elongated post means for movement about an axis extending transversely of said support means, said support means in use being substantially balanced about said axis, said post means extending upwardly from said elongated support means whereby said post means and said chain saw drive motor may be gripped by an operator and manipulated to move said blade means towards and away from a stump to be removed.

7. Apparatus according to claim 6, wherein said blade means is mounted on shaft means extending transversely of said elongated support means, said blade means being supported at an inclined angle relative to said shaft means whereby said blade means oscillates upon rotation to facilitate removal of said stump.

8. Apparatus according to claim 7, and including a pair of mating offset collars mounted on said shaft means and engaged with opposite sides of said blade means to maintain said blade means at said inclined angle relative to said shaft means.

9. The apparatus according to claim 6 including handle means at the upper end of said post means and at the end of said elongated support means opposite the blade means for manually gripping said post and support means.

* * * * *